United States Patent
Jing et al.

(10) Patent No.: US 11,692,827 B2
(45) Date of Patent: Jul. 4, 2023

(54) WHITE LIGHT INTERFEROMETRIC FIBER-OPTIC GYROSCOPE BASED ON RHOMBIC OPTICAL PATH DIFFERENCE BIAS STRUCTURE

(71) Applicant: DALIAN UNIVERSITY OF TECHNOLOGY, Liaoning (CN)

(72) Inventors: Zhenguo Jing, Liaoning (CN); Wei Peng, Liaoning (CN); Ang Li, Liaoning (CN); Yueying Liu, Liaoning (CN); Qiang Liu, Liaoning (CN); Zhiyuan Huang, Liaoning (CN); Yang Zhang, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 0 days.

(21) Appl. No.: 17/626,299

(22) PCT Filed: Jul. 28, 2021

(86) PCT No.: PCT/CN2021/108784
§ 371 (c)(1),
(2) Date: Jan. 11, 2022

(87) PCT Pub. No.: WO2022/028281
PCT Pub. Date: Feb. 10, 2022

(65) Prior Publication Data
US 2022/0349713 A1 Nov. 3, 2022

(30) Foreign Application Priority Data
Aug. 6, 2020 (CN) .......................... 202010782885.0

(51) Int. Cl.
*G01C 19/72* (2006.01)
*G01B 9/0209* (2022.01)

(52) U.S. Cl.
CPC ......... *G01C 19/721* (2013.01); *G01B 9/0209* (2013.01); *G01C 19/722* (2013.01)

(58) Field of Classification Search
CPC ........................ G01C 19/721; G01C 19/722
(Continued)

(56) References Cited

U.S. PATENT DOCUMENTS

2014/0218739 A1    8/2014  Bergh
2021/0311248 A1*  10/2021  Taranta .............. G02B 6/02357

FOREIGN PATENT DOCUMENTS

CN    101360969 A     2/2009
CN    102128621 A     7/2011
(Continued)

OTHER PUBLICATIONS

Zheng, Jesse et al. "All-fiber single-mode fiber frequency-modulated continuous-wave Sagnac gyroscope". Optics Letters, vol. 30, No. 1, Jan. 1, 2005, pp. 17-19. (Year: 2005).*
(Continued)

*Primary Examiner* — Michael A Lyons
(74) *Attorney, Agent, or Firm* — Muncy, Geissler, Olds & Lowe, P.C.

(57) ABSTRACT

A white light interferometric fiber-optic gyroscope based on a rhombic optical path difference bias structure includes a laser, a rhombic optical path difference bias structure, a fiber coil and a photodetector. The white light interferometric fiber-optic gyroscope adopts an all-fiber structure to simplify the complexity of a gyroscope system and reduce the overall cost. A white light interferometric demodulation algorithm is used to realize linear output of rotation rate signals.

6 Claims, 2 Drawing Sheets

(58) Field of Classification Search
USPC .......................................................... 356/466
See application file for complete search history.

(56) References Cited

FOREIGN PATENT DOCUMENTS

| | | | | | |
|---|---|---|---|---|---|
| CN | 109029413 | A | * | 12/2018 | ........... G01C 19/721 |
| CN | 111272197 | A | * | 6/2020 | |
| CN | 111947641 | A | | 11/2020 | |
| EP | 1096227 | A1 | | 5/2001 | |

OTHER PUBLICATIONS

Zhang Chao et al; "Multiplexed double-axis fiber optic gyroscope"; Journal of Zhejiang University (Engineering Science) ; vol. 47, No. 12, Dec. 2013;pp. 2184-2259.

* cited by examiner

WHITE LIGHT INTERFEROMETRIC FIBER-OPTIC GYROSCOPE BASED ON RHOMBIC OPTICAL PATH DIFFERENCE BIAS STRUCTURE

TECHNICAL FIELD

The present invention relates to a white light interferometric fiber-optic gyroscope based on a rhombic optical path difference (OPD) bias structure, and belongs to the technical field of fiber optic gyroscopes.

BACKGROUND

As a novel inertial rotation rate sensor with rapid development, the fiber-optic gyroscope has attracted the attention of many scientific research institutions since appeared. Compared with the traditional mechanical gyroscope, the fiber-optic gyroscope has no moving component and wear component, is an all-solid-state instrument and has the advantages of low cost, long service life, light weight, small volume, large dynamic range, wide precision application coverage and electromagnetic interference resistance. Compared with the laser gyroscope, the fiber-optic gyroscope does not need several thousand volts of ignition voltage, does not need to overcome the mechanical jitter device for self-locking, does not need ultra-high precision optical processing, does not need very strict gas sealing, and is easy to assemble. The fiber-optic gyroscope is a novel all-solid state inertial device with simple structure, low potential cost and high potential accuracy.

The fiber-optic gyroscopes can be divided into three types: interferometric fiber-optic gyroscope, resonator fiber-optic gyroscope and stimulated Brillouin scattering fiber optic gyroscope according to the optical working principles. The interferometric fiber-optic gyroscope has the highest degree of technology maturity and product commercialization. Its commercial products are divided into speed level, tactical level, inertia level and strategic level according to zero bias error from high to low, and are widely used in the fields of transportation, military equipment and spatial positioning.

SUMMARY

The purpose of the present invention is to propose a white light interferometric fiber-optic gyroscope based on a rhombic optical path difference bias structure, which has the obvious advantages of all-fiber structure, high speed of algorithm demodulation, linear output of rotation rate signal, low system cost and small gyroscope volume.

The technical solution of the present invention is as follows:

A white light interferometric fiber-optic gyroscope based on a rhombic optical path difference bias structure comprises a laser, a rhombic optical path difference bias structure, a fiber coil and a photodetector.

The rhombic optical path difference bias structure comprises four fiber couplers with a splitting ratio of 50:50 or adopts a rhombic optical path difference bias structure based on a planar lightwave circuit (PLC) technology. The fiber-optics rhombic optical path difference bias structure comprises four fiber couplers with a splitting ratio of 50:50, and fibers for connecting the fiber couplers; a ring is formed by connection between a first fiber coupler and a second fiber coupler, between the second fiber coupler and a third fiber coupler, between the third fiber coupler and a fourth fiber coupler and between the fourth fiber coupler and the first fiber coupler respectively by a first fiber, a second fiber, a third fiber and a fourth fiber; wherein the lengths of the first fiber, the second fiber, the third fiber and the fourth fiber are inconsistent to introduce an optical path difference bias d;

The laser is connected with the first fiber coupler through a fifth fiber, and the photodetector is connected with the third fiber coupler through a sixth fiber;

Both ends of the fiber coil are connected with the second fiber coupler and the fourth fiber coupler respectively.

The laser is a wavelength sweeping laser or a broadband light source laser.

The photodetector is a synchronous detector or an optical spectrum analyzer.

The fiber coil is a single-mode fiber or a polarization-maintaining fiber, and the number of the fiber coil is 1 or 2.

Optionally, an optical bandpass filter can be connected behind the rhombic optical path difference bias structure.

Optionally, the optical bandpass filter can be, but is not limited to, a one-in and two-out coarse wavelength division multiplexer (CWDM), and an optical bandwidth channel can be, but is not limited to, 1520 nm-1540 nm or 1540 nm-1560 nm.

The present invention has the following beneficial effects: the white light interferometric fiber-optic gyroscope based on the rhombic optical path difference bias structure in the present invention has the obvious advantages of all-fiber structure, easy processing and assembling, high speed of algorithm demodulation, linear output of rotation rate signal, low system cost, simple electrical system and small gyroscope volume.

In the figures: 1 first fiber; 2 second fiber; 3 third fiber; 4 fourth fiber; 5 first fiber coupler; 6 second fiber coupler; 7 third fiber coupler; 8 fourth fiber coupler; 9 laser; 10 photodetector; 11 first fiber coil; 12 first port of first fiber coupler; 13 second port of first fiber coupler; 14 third port of first fiber coupler; 15 first port of second fiber coupler; 16 second port of second fiber coupler; 17 first port of third fiber coupler; 18 second port of third fiber coupler; 19 first port of fourth fiber coupler; 20 second port of fourth fiber coupler; 21 third port of second fiber coupler; 22 third port of third fiber coupler; 23 third port of fourth fiber coupler; 24 fourth port of first fiber coupler; 25 fourth port of second fiber coupler; 26 second fiber coil; 27 fourth bandpass filter; 28 second bandpass filter; 29 first port; 30 second port; 31 third port; 32 fourth port; 33 first waveguide; 34 second waveguide; 35 third waveguide; 36 fourth waveguide.

DETAILED DESCRIPTION

Specific embodiments of the present invention are described below in detail in combination with the technical solution and accompanying drawings.

The present invention provides a white light interferometric fiber-optic gyroscope based on a rhombic optical path difference bias structure. Fiber-optic gyroscopes can be divided into a single fiber coil type or a dual fiber coil differential type according to the difference of the number of the used fiber coils.

Embodiment 1

Figure 1:
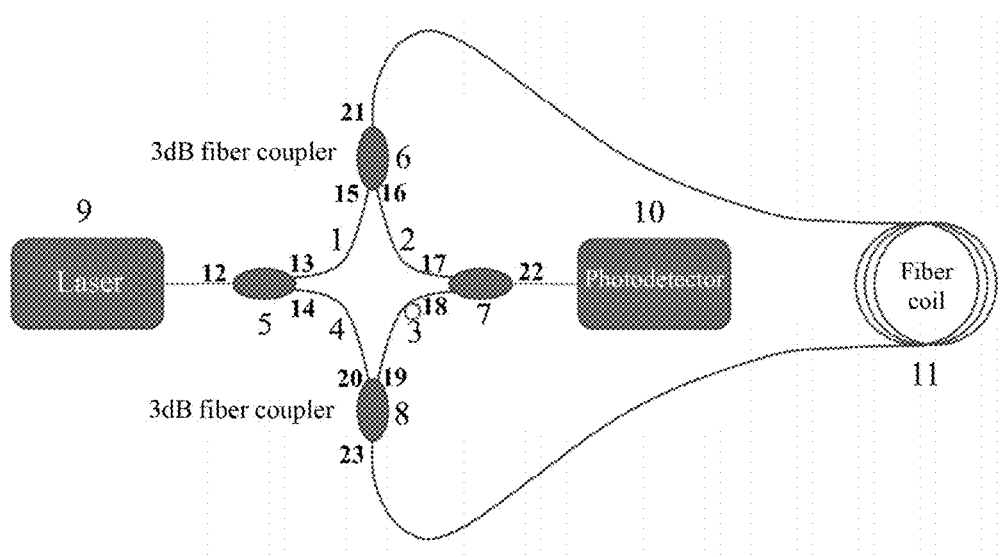
FIG. 1 is a structural diagram of a white light interferometric fiber-optic gyroscope based on a single coil structure.

A schematic diagram is shown as FIG. 1. The white light interferometric fiber-optic gyroscope comprises a laser 9, a first fiber coupler 5, a second fiber coupler 6, a third fiber coupler 7, a fourth fiber coupler 8, a first fiber coil 11 and a photodetector 10.

The optical output end of the laser 9 is connected with a first port 12 of a first fiber coupler through a single-mode fiber; a second port 13 of the first fiber coupler is connected with a first port 15 of a second fiber coupler through a first fiber 1; a third port 14 of the first fiber coupler is connected with a second port 20 of a fourth fiber coupler through a fourth fiber 4; a third port 21 of the second fiber coupler is connected with a third port 23 of the fourth fiber coupler through a first fiber coil 11; a second port 18 of a third fiber coupler is connected with a first port 19 of the fourth fiber coupler through a third fiber 3; a first port 17 of the third fiber coupler is connected with a second port 16 of the second fiber coupler through a second fiber 2; and a third port 22 of the third coupler is connected with a synchronous detector or an optical spectrum analyzer through the single-mode fiber.

In the present invention, the first fiber 1 for connection between the first fiber coupler 5 and the second fiber coupler 6, the second fiber 2 for connection between the second fiber coupler 6 and the third fiber coupler 7, the third fiber 3 for connection between the third fiber coupler 7 and the fourth fiber coupler 8 and the fourth fiber 4 for connection between the fourth fiber coupler 8 and the fourth port 24 of the first fiber coupler form the fiber type rhombic optical path difference bias structure.

In the present invention, the laser 9 is a wavelength sweeping laser or a broadband light source laser; and the photodetector 10 is a synchronous detector or an optical spectrum analyzer. Light intensity of interference spectrum detected by the photodetector is:

$$I = I_0 \cos(1+\phi_s)$$

In the structure, the optical path difference bias of clockwise beam (CW) and counterclockwise beam (CCW) is realized by the combination of four 1*2 fiber couplers.

For the CW direction, from a light source, a propagation route is:

laser 9-first fiber coupler 5-first fiber 1-second fiber coupler 6-first fiber coil 11-fourth fiber coupler 8-third fiber 3-third fiber coupler 7-photodetector 10.

For the CCW direction, from the light source, a propagation route is:

laser 9-first fiber coupler 5-fourth fiber 4-fourth fiber coupler 8-first fiber coil 11-second fiber coupler 6-second fiber 2-third fiber coupler 7-photodetector 10.

Non-reciprocal optical path parts that cause the optical path difference bias are respectively:

Clockwise: first fiber 1-second fiber coupler 6-first fiber coil 11-fourth fiber coupler 8-third fiber 3;

Counterclockwise: fourth fiber 4-fourth fiber coupler 8-first fiber coil 11-second fiber coupler 6-second fiber 2.

Considering that the second fiber coupler 6 and the fourth fiber coupler 8 as well as the first fiber coil 11 are the common part of the two optical paths, they can be counted in a reciprocal optical path part.

In this way, the non-reciprocal optical path parts of a clockwise optical path and a counterclockwise optical path are:

Clockwise: first fiber 1-third fiber 3;
Counterclockwise: fourth fiber 4-second fiber 2.

In this way, when a structural optical path is designed, an optical path difference d in the range of tens of um to several mm can be introduced between the optical path combination of the first fiber 1-third fiber 3 clockwise and the optical path combination of the fourth fiber 4-second fiber 2 counterclockwise, so as to satisfy the requirements of the optical path difference bias of two beams involved in interference in the white light interferometric signal demodulation mode.

For the CW and the CCW, due to rotation of the fiber coil, Sagnac shift is caused.

$$\phi_s = \frac{4\pi RL}{\lambda c}\Omega$$

wherein L is fiber length, R is the radius of the fiber coil, λ is optical wavelength, c is speed of light in vacuum and Ω is rotation rate.

For the first fiber coil 11, interference spectrum generated by interference between the CW and the CCW is:

$$I_a(\lambda) = E + F\cos\left(\frac{4\pi d}{\lambda} + \frac{4\pi RL}{\lambda c}\Omega\right) = E + F\cos\left(\frac{4\pi}{\lambda}\left(d + \frac{RL}{c}\Omega\right)\right)$$

The interference spectrum is processed to obtain the optical path difference between the CW and the CCW of the first fiber coil 11:

$$D_a = d + \frac{RL}{c}\Omega$$

d is the introduced known optical path difference, L is the fiber length, R is the radius of the fiber coil, and c is speed of light in vacuum, which are determined known quantities, so as to obtain the rotation rate Ω.

Figure 2:
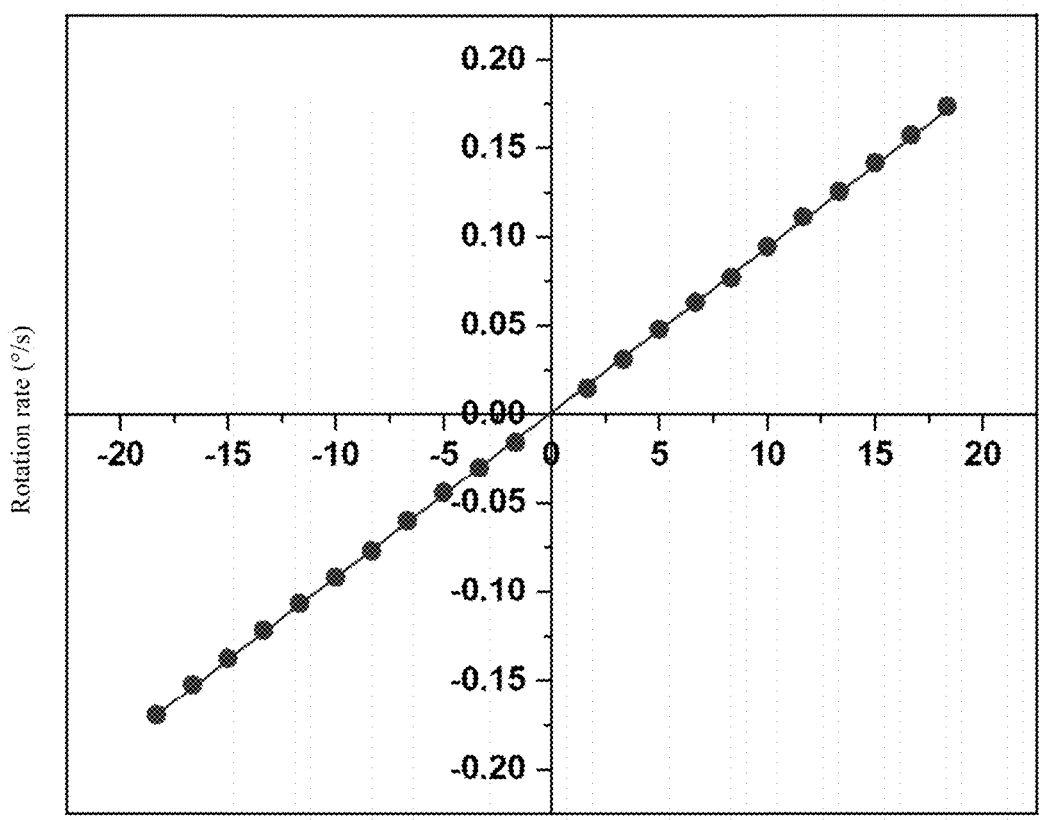
FIG. 2 is a diagram of rotation rate-OPD difference of a white light interferometric fiber-optic gyroscope based on a single coil structure.

FIG. 2 shows the rotating speed measurement experiment of a rotation table of the white light interferometric fiber-optic gyroscope based on the rhombic optical path difference bias structure. The figure shows that the difference of OPD demodulated with the rotating speed of the table and the fiber-optic gyroscope is linear. The experiment shows that the white light interferometric fiber-optic gyroscope based on the rhombic optical path difference bias structure can realize the rotating speed measurement function.

Figure 4:
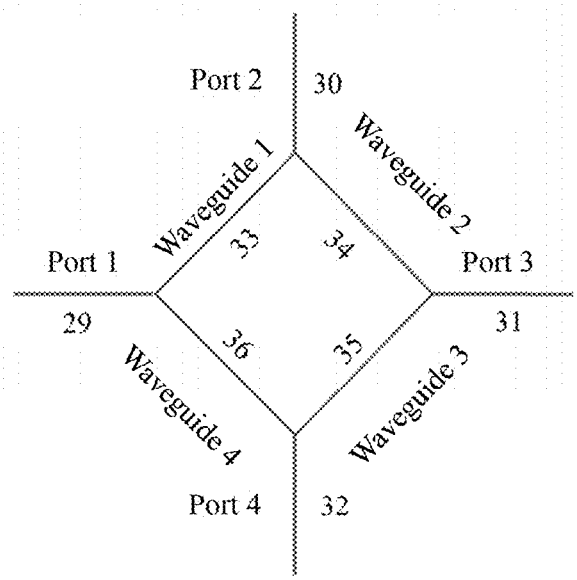
FIG. 4 is a structural diagram of a white light interferometric fiber-optic gyroscope based on a dual coil difference structure.

Optionally, the rhombic optical path difference bias structure can be realized by a planar lightwave circuit (PLC) technology. The PLC is made by a semiconductor technology. The PLC is located on the upper surface of a chip, and can integrate optical routing functions of shunt and junction in the chip. Multichannel fiber arrays at the input end and the output end are coupled at both ends of the chip and encapsulated. The PLC technology is the current main mature technology that realizes fiber devices of fiber shunts and arrayed waveguide grating. Through the structural design of the light wave, the optical routing functions of shunt, junction and the optical path difference bias required by the rhombic optical path difference bias structure can be integrated into a PLC to realize a PLC device of the rhombic optical path difference bias structure that has compact structure and single chip. As shown in FIG. 4, the lengths of the first waveguide 33, the second waveguide 34, the third waveguide 35 and the fourth waveguide 36 are not completely consistent in the waveguide design structure of the PLC device of the rhombic optical path difference bias structure; the design requirements of the optical path difference biasd={first fiber 1+third fiber 3}−{fourth fiber 4+second fiber 2} are satisfied; and d is within a range of tens of um to several mm. A first port 29, a second port 30, a third port 31 and a fourth port 32 are aligned and coupled with the corresponding input and output fibers.

After the above structure is adopted, the specific embodiment has the beneficial effects: the white light interferometric fiber-optic gyroscope based on the rhombic optical path difference bias structure in the specific embodiment has the advantages of simple structure, simple algorithm, stable operation and stable output in complex electromagnetic environments.

Embodiment 2

Figure 3:
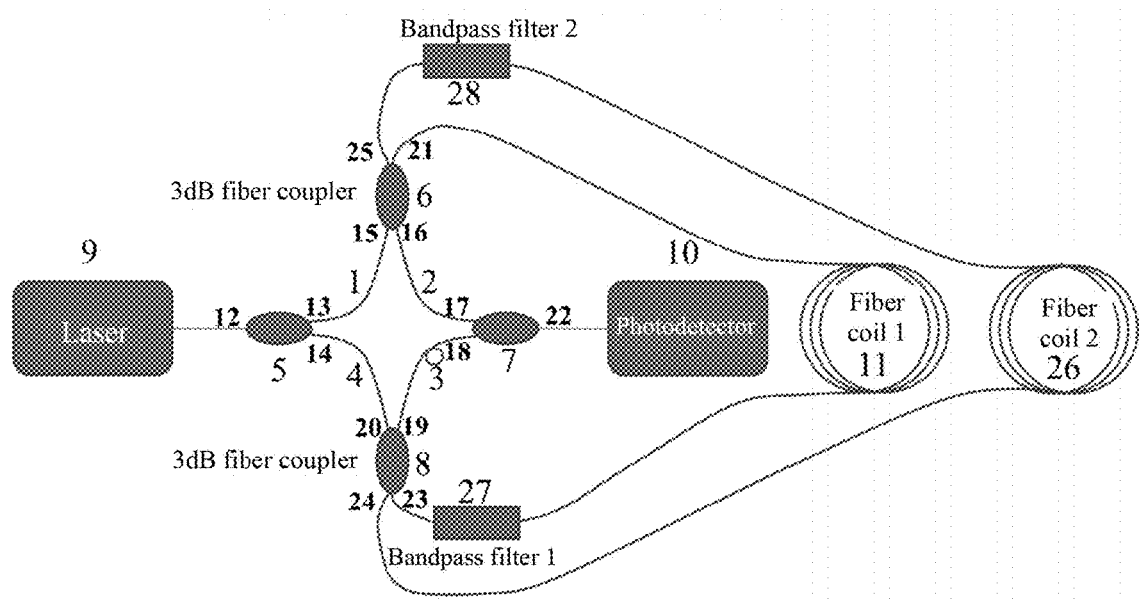
FIG. 3 is a structural diagram of a rhombic optical path difference bias based on PLC technology.

A schematic diagram is shown as FIG. 3. The white light interferometric fiber-optic gyroscope comprises a laser 9, a first fiber coupler 5, a second fiber coupler 6, a third fiber coupler 7, a fourth fiber coupler 8, a first fiber coil 11, a second fiber coil 26, a first bandpass filter 27, a second bandpass filter 28 and a photodetector 10.

The optical output end of the laser 9 is connected with the first port 12 of the first fiber coupler through a single-mode fiber; the second port 13 of the first fiber coupler is connected with the first port 15 of the second fiber coupler through a first fiber 1; a third port 14 of the first fiber coupler is connected with a second port 20 of a fourth fiber coupler through a fourth fiber 4; a fourth port 25 of the second fiber coupler is connected with a second optical bandpass filter 28 through the fiber; a third port 21 of the second fiber coupler is connected with a first optical bandpass filter 27 through a first fiber coil 11; a second port 18 of a third fiber coupler is connected with a first port 19 of the fourth fiber coupler through a third fiber 3; a first port 17 of the third fiber coupler is connected with a second port 16 of the second fiber coupler through a second fiber 2; and a third port 22 of the third coupler is connected with a synchronous detector or an optical spectrum analyzer (10) through the single-mode fiber. The second port 20 of the fourth fiber coupler is connected with the third port 14 of the first fiber coupler through the fourth fiber 4; the fourth port 24 of the first fiber coupler is connected with the second optical bandpass filter 28 through the second fiber coil 26; the third port 23 of the fourth fiber coupler 8 is connected with the first optical bandpass filter 27; and meanwhile, the detector 10 receives an interference signal of the fiber-optic gyroscope.

In the present invention, the laser 9 is a wavelength sweeping laser or a broadband light source laser; and the photodetector 10 is a synchronous detector or an optical spectrum analyzer. Light intensity of interference spectrum detected by the photodetector is:

$$I=I_0 \cos(1+\phi_s)$$

In the present invention, the first fiber coupler 5, the second fiber coupler 6, the second bandpass filter 28, the first fiber coil 11, the third fiber coupler 7, the second fiber coil 26, the fourth fiber coupler 8, and the first bandpass filter 27 form two Sagnac interferometers. The absolute value of required Sagnac shift $\phi_s$ is extracted by differential operation of the interference spectrum.

In the present invention, the first fiber 1 for connection between the first fiber coupler 5 and the second fiber coupler 6, the second fiber 2 for connection between the second fiber coupler 6 and the third fiber coupler 7, the third fiber 3 for connection between the third fiber coupler 7 and the fourth fiber coupler 8 and the fourth fiber 4 for connection between the fourth fiber coupler 8 and the fourth port 24 of the first fiber coupler form the fiber type rhombic optical path difference bias structure. To satisfy the white light interferometric signal demodulation mode, an optical path difference bias d in the range of tens of μm to several mm can be introduced between the optical path: the first fiber 1-third fiber 3 and the optical path: the fourth fiber 4-second fiber 2. The rotation rate Ω of the fiber-optic gyroscope is extracted in the white light interferometric signal demodulation technique in the present invention. The paths of light passing through the first fiber coil 11 and the fiber 2(12) are clockwise and counterclockwise directions of propagation. For the CW for the first fiber coil 11, from a light source, a propagation route is: laser 9-first fiber coupler 5-first fiber 1-second fiber coupler 6-first fiber coil 11-first bandpass filter 27-fourth fiber coupler 8-third fiber 3-third fiber coupler 7-photodetector 10.

For the CCW, from the light source, a propagation route is: laser 9-first fiber coupler 5-fourth fiber 4-fourth fiber coupler 8-first bandpass filter 27-first fiber coil 11-second fiber coupler 6-second fiber 2-third fiber coupler 7-photodetector 10.

Non-reciprocal optical path parts that cause the optical path difference bias are respectively:

Clockwise: first fiber 1-second fiber coupler 6-first fiber coil 11-fourth fiber coupler 8-third fiber 3.

Counterclockwise: fourth fiber 4-fourth fiber coupler 8-first fiber coil 11-second fiber coupler 6-second fiber 2.

Considering that the second fiber coupler 6 and the fourth fiber coupler 8 as well as the first fiber coil 11 are the common part of the two optical paths, they can be counted in a reciprocal optical path part.

In this way, the non-reciprocal optical path parts of a clockwise optical path and a counterclockwise optical path are:

Clockwise: first fiber 1-third fiber 3

Counterclockwise: fourth fiber 4-second fiber 2.

For the second fiber coil 26, the optical path of the CW is: laser 9-first fiber coupler 5-fourth fiber 4-fourth fiber coupler 8-second fiber coil 26-second bandpass filter 28-second fiber coupler 6-second fiber 2-third fiber coupler 7-photodetector 10.

The optical path of the CCW is:

laser 9-first fiber coupler 5-fiber (1)-second fiber coupler 6-second bandpass filter 28-second fiber coil 26-fourth fiber coupler 8-third fiber 3-third fiber coupler 7-photodetector 10.

For the second fiber coil 26, the non-reciprocal optical path parts of the clockwise optical path and the counterclockwise optical path are:

Clockwise: fourth fiber 4-second fiber 2;
Counterclockwise: first fiber 1-third fiber 3.

If the optical path difference bias between the clockwise optical path and the counterclockwise optical path of the first fiber coil 11 is d, the bias optical path difference between the clockwise optical path and the counterclockwise optical path of the second fiber coil 26 is −d For the CW and the CCW, due to rotation of the fiber coil, Sagnac shift is caused.

$$\phi_s = \frac{4\pi RL}{\lambda c}\Omega$$

wherein L is fiber length, R is the radius of the fiber coil, λ is optical wavelength, c is speed of light in vacuum and Ω is rotation rate.

For the first fiber coil 11, interference spectrum generated by interference between the CW and the CCW is:

$$I_a(\lambda) = E + F\cos\left(\frac{4\pi d}{\lambda} + \frac{4\pi RL}{\lambda c}\Omega\right) = E + F\cos\left(\frac{4\pi}{\lambda}\left(d + \frac{RL}{c}\Omega\right)\right)$$

The interference spectrum is processed to obtain the optical path difference between the CW and the CCW of the first fiber coil 11:

$$D_a = d + \frac{RL}{c}\Omega$$

For the second fiber coil 26, interference spectrum generated by interference between the CW and the CCW is:

$$I_b(\lambda) = G + H\cos\left(\frac{4\pi \cdot (-d)}{\lambda} + \frac{4\pi RL}{\lambda c}\Omega\right) =$$
$$G + H\cos\left(\frac{4\pi d}{\lambda} - \frac{4\pi RL}{\lambda c}\Omega\right) = G + H\cos\left(\frac{4\pi}{\lambda}\left(d - \frac{RL}{c}\Omega\right)\right)$$

The interference spectrum is processed to obtain the optical path difference between the CW and the CCW of the second fiber coil 26:

$$D_b = d - \frac{RL}{c}\Omega$$

The pair of differential signals $D_a$ and $D_b$ is subtracted, i.e., $D_a-D_b$, to eliminate the effect of the optical path difference bias d of a common mode component to obtain the required differential mode component.

$$D_a - D_b = \frac{2RL}{c}\Omega$$

L is the fiber length, R is the radius of the fiber coil, and c is speed of light in vacuum, which are determined known quantities, so as to obtain the rotation rate Ω.

In the present embodiment, the bandpass of the first optical bandpass filter 27 connected with the first fiber coil 11 is set as 1520-1540 nm, and the bandpass of the second optical bandpass filter 28 connected with the second fiber coil 26 can be set as 1540-1560 nm. In this way, the interference spectrum of the first fiber coil 11 in the wavelength range of 1520-1540 nm and the interference spectrum of the second fiber coil 26 in the wavelength range of 1540-1560 nm can be obtained simultaneously through the laser 9 and the photodetector 10 without affecting each other.

Optionally, the rhombic optical path difference bias structure can be realized by a planar lightwave circuit (PLC) technology. As shown in FIG. 4, the lengths of the first waveguide 33, the second waveguide 34, the third waveguide 35 and the fourth waveguide 36 are not completely consistent in the waveguide design structure of the PLC device of the rhombic optical path difference bias structure; the design requirements of the optical path difference biasd={first fiber 1+third fiber 3}−{fourth fiber 4+second fiber 2} are satisfied; and d is within a range of tens of um to several mm. A first port 29, a second port 30, a third port 31 and a fourth port 32 are aligned and coupled with the corresponding input and output fibers.

After the above structure is adopted, the specific embodiment has the beneficial effects: the white light interferometric fiber-optic gyroscope based on the rhombic optical path difference bias structure in the specific embodiment has the advantages of small bias shift, stable structure, simple algorithm, strong ability to resist environmental interference and stable output in complex electromagnetic environments.

Although the above disclosure shows exemplary embodiments of the present invention, it should be noted that multiple changes and modifications can be made without departing from the scope of the present invention defined by the claims. According to the structure of the embodiments of the present invention described herein, the components of the claims can be replaced by any functionally equivalent component. Therefore, the protection scope of the present invention shall be determined by the content of appended claims.

The invention claimed is:

1. A white light interferometric fiber-optic gyroscope based on a rhombic optical path difference bias structure, the white light interferometric fiber-optic gyroscope based on the rhombic optical path difference bias structure comprising:
   a laser;
   a rhombic optical path difference bias structure;
   a fiber coil; and
   a photodetector,
   wherein the rhombic optical path difference bias structure comprises four fiber couplers with a splitting ratio of 50:50, and fibers for connecting the fiber couplers; a ring is formed by connection between a first fiber coupler and a second fiber coupler, between the second fiber coupler and a third fiber coupler, between the third fiber coupler and a fourth fiber coupler and between the fourth fiber coupler and the first fiber coupler respectively by a first fiber, a second fiber, a third fiber and a fourth fiber; wherein the lengths of the first fiber, the second fiber, the third fiber and the fourth fiber are inconsistent to introduce an optical path difference bias,
   wherein an optical bandpass filter is connected behind the rhombic optical path difference bias structure,
   wherein the laser is connected with the first fiber coupler through a fifth fiber, and the photodetector is connected with the third fiber coupler through a sixth fiber, and
   wherein both ends of the fiber coil are connected with the second fiber coupler and the fourth fiber coupler respectively.

2. The white light interferometric fiber-optic gyroscope based on the rhombic optical path difference bias structure according to claim 1, wherein the laser is a wavelength sweeping laser or a broadband light source laser.

3. The white light interferometric fiber-optic gyroscope based on the rhombic optical path difference bias structure according to claim 1, wherein the photodetector is a synchronous detector or an optical spectrum analyzer.

4. The white light interferometric fiber-optic gyroscope based on the rhombic optical path difference bias structure according to claim 3, wherein the fiber coil is a single-mode fiber or a polarization-maintaining fiber, and there is either a single fiber coil or a pair of fiber coils in the gyroscope.

5. The white light interferometric fiber-optic gyroscope based on the rhombic optical path difference bias structure according to claim 1, wherein the fiber coil is a single-mode fiber or a polarization-maintaining fiber, and there is either a single fiber coil or a pair of fiber coils in the gyroscope.

6. The white light interferometric fiber-optic gyroscope based on the rhombic optical path difference bias structure according to claim 1, wherein the optical bandpass filter is a one-in and two-out coarse wavelength division multiplexer (CWDM), and an optical bandwidth channel of the CWDM is 1520 nm-1540 nm or 1540 nm-1560 nm.

\* \* \* \* \*